UNITED STATES PATENT OFFICE.

ERNST ERDMANN, OF HALLE-ON-THE-SAALE, GERMANY, ASSIGNOR TO ACTIEN GESELLSCHAFT FÜR ANILIN FABRIKATION, OF HALLE-ON-THE-SAALE, GERMANY.

PARA-AMINODIPHENYLAMIN SULFONIC ACID AND PROCESS OF MAKING THE SAME.

No. 869,073.     Specification of Letters Patent.     Patented Oct. 22, 1907.

Application filed November 19, 1906. Serial No. 344,177. (Specimens.)

*To all whom it may concern:*

Be it known that I, ERNST ERDMANN, of Halle-on-the Saale, Margarethen street 1, German Empire, have invented new and useful Improvements in New Para-Aminodiphenylamin Sulfonic Acid and Processes of Making Same; and I do hereby declare that the following is a full, clear, and exact description thereof, which will enable others skilled in the art to which it appertains to make and use the same.

My present invention relates to the manufacture of a new sulfonic acid of para-aminodiphenylamin it having been found that by acting on this amido-compound with "mono-hydrate" (sulfuric acid containing 100 per cent. $H_2SO_4$) or with a fuming sulfuric acid of suitable concentration, such a new sulfonic acid is obtained. whereas as is well known, by the action of the commercial sulfuric acid of 66° Baumé specific gravity on para-aminodiphenylamin sulfonation occurs only to a very small extent and with the formation of a large proportion of by-products. Moreover according to the present invention this new sulfonic acid of para-aminodiphenylamin is obtained with a good yield (75–80% of a theoretical yield) and without the occurrence of any considerable decomposition.

The reaction proceeds according to the following equation:

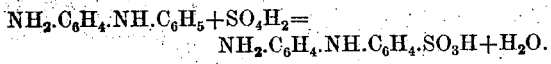

$NH_2.C_6H_4.NH.C_6H_5 + SO_4H_2 =$
$\qquad NH_2.C_6H_4.NH.C_6H_4.SO_3H + H_2O.$ As to the constitution of the acid it appears to be the para-aminodiphenylamin-para'-sulfonic acid:

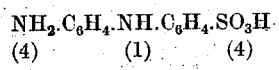

$NH_2.C_6H_4.NH.C_6H_4.SO_3H$
(4)    (1)    (4)

in view of the fact that, by heating an alkali salt of the new sulfonic acid with alkalihydroxid and some water in a closed tube to about 160° C, the product is split up, forming para-aminophenol at one side and on the other side sulfanilic acid.

In carrying out the sulfonation a somewhat higher temperature such as about 100–130° centigrade must be used. Besides that the temperature as well as the duration of the reaction depend to some extent upon the strength of the fuming sulfuric acid if such is used. In every case care must be taken that evolution of sulfur dioxid occurs only to a slight extent.

The following example may serve to illustrate my invention, the parts being by weight: 30 parts of the commercial concentrated sulfuric acid (66° Baumé specific gravity) are added with the calculated quantity of sulfur trioxid in order to form "mono-hydrate", then 10 parts of finely powdered para-aminophenylamin are introduced thereto while stirring well and care being taken by cooling with cold water that the temperature does not exceed 30° centigrade. Now the mass is heated in an oil-bath to 125° centigrade till a sample of the melt dissolves totally in soda solution. This occurs after 2 to 3 hours, the melt then being poured into four times its weight of cold water; the greatest part of the sulfonic acid immediately separates out whereas when the mass is allowed to stand for some time a further small part of the acid precipitates in a crystalline form. The precipitate is filtered from the solution and washed with cold water; it is preferable to directly purify the sulfonic acid by dissolving it in eight times its weight of an aqueous solution of sodium carbonate, containing seven per cent. of the carbonate. From this solution, when necessary after filtration, the pure sulfonic acid is precipitated by the addition of hydrochloric acid, filtered, washed and dried.

It is convenient to say that whereas in the foregoing example the duration of the reaction was at 2–3 hours, the reaction may be performed in less time and also the temperature may be somewhat diminished, if fuming sulfuric acid is used; for instance when using a fuming acid of 8 per cent. strength of sulfur trioxid, the reaction is finished in 2 hours at a temperature of 120° centigrade. In the case of a fuming sulfuric acid of 15 per cent. strength of $SO_3$ the reaction takes one hour at 110–120° centigrade.

The new para-aminodiphenylamin sulfonic acid obtained as above is characterized by the following physical and chemical qualities. It is difficultly soluble in hot water and crystallizes from a hot aqueous solution in fine needles arranging themselves to a concentric bundle. The sodium salt of the new acid is very easily soluble in water, whereas the potassium salt is somewhat less soluble and may therefore be easily obtained in a pure state. This potassium salt when dried *in vacuo* has the composition $C_{12}H_{11}N_2SO_3K$ as shown by analysis.

The proportion of boiling water which is necessary to dissolve para-aminodiphenylamin sulfonic acid is most characteristic for the new acid; it was found that one part of the acid needs 125.5 parts of boiling water for dissolution. Also the colorations are characteristic which are produced in a dilute aqueous solution of the sulfonic acid by the action of oxidizing agents; ferric chlorid when added to such an aqueous solution at ordinary temperature causes a red-yellow coloration, the same is the case with a mixture of potassium bichromate and acetic acid. Finally by the action of nitrous acid on this amido-sulfonic acid in the usual manner there is obtained a diazo-compound which separates from the aqueous solution as a yellow and crystalline precipitate.

It is obvious to those skilled in the art that my present invention is not limited to the foregoing example nor to the details given therein. As already stated the duration of the heating and more especially the temperature at which the reaction is carried out depend to a great deal upon the strength of the sulfuric acid i. e. the percentage of sulfur trioxid. Generally speaking the use of a stronger fuming sulfuric acid will allow either to diminish the duration of the heating or to perform the reaction at a somewhat lower temperature, but on the other hand the percentage of the fuming acid may not exceed a certain strength and this limit lies at about 20 per cent. of $SO_3$.

As to the purification of the para-aminodiphenylamin-sulfonic acid it may of course be performed in any suitable way other than that given in the example.

Having now described my invention and the manner in which the same is to be performed what I claim is,—

1. The hereinbefore described process of producing a new para-aminodiphenylamin sulfonic acid, which is the para-aminodiphenylamin-para'-sulfonic acid and which process consists in heating para-aminodiphenylamin with a concentrated sulfuric acid containing between 0 and 20% of free sulfur trioxid to temperatures between 100 and 130 degrees centigrade.

2. As a new composition of matter a para-aminodiphenylamin sulfonic acid which is the para-aminodiphenylamin-para'-sulfonic acid and which acid may be obtained by the action of mono-hydrate sulfuric acid on para-aminodiphenylamin at 125° centigrade for 2 to 3 hours, and which new sulfonic acid is difficultly soluble in hot water and crystallizes in fine needles, and one part of this sulfonic acid being soluble in 125.5 parts of boiling water, the sodium salt of which acid is very easily soluble in water, whereas the potassium salt is somewhat less soluble and possesses when dried in vacuo the composition: $C_{12}H_{11}N_2SO_3K$, a dilute aqueous solution of this sulfonic acid, when added at ordinary temperature with some ferric chlorid or with a mixture of potassium bichromate and of acetic acid, showing a red yellow coloration, and this new para aminodiphenylamin sulfonic acid by the action of nitrous acid in the usual manner being converted into a diazo compound possessing a yellow color and being difficultly soluble in water.

In witness whereof I have hereunto signed my name, in the presence of two subscribing witnesses.

ERNST ERDMANN.

Witnesses:
RUDOLPH FRICKE.
SOUTHARD P. WARNER.